United States Patent
Beckmann

(10) Patent No.: US 7,675,947 B2
(45) Date of Patent: Mar. 9, 2010

(54) DATA TRANSMISSION WITH BUNDLING OF MULTIPLE TRANSMISSION CHANNEL FACILITIES

(75) Inventor: Friedrich Beckmann, Munich (DE)

(73) Assignee: Infineon Technologies AG, Neubiberg (DE)

( * ) Notice: Subject to any disclaimer, the term of this patent is extended or adjusted under 35 U.S.C. 154(b) by 878 days.

(21) Appl. No.: 11/444,742

(22) Filed: May 31, 2006

(65) Prior Publication Data

US 2006/0285549 A1 Dec. 21, 2006

(30) Foreign Application Priority Data

May 31, 2005 (DE) .................. 10 2005 024 782

(51) Int. Cl.
*H04J 3/04* (2006.01)
(52) U.S. Cl. .................. 370/535; 370/465; 370/542
(58) Field of Classification Search .......... 370/465, 370/466, 469, 535, 536, 537, 542, 395.1, 370/395.53, 395.6
See application file for complete search history.

(56) References Cited

U.S. PATENT DOCUMENTS

| | | | | |
|---|---|---|---|---|
| 6,222,858 B1 * | 4/2001 | Counterman | .............. | 370/474 |
| 6,574,191 B1 * | 6/2003 | Usukura et al. | ............. | 370/216 |
| 7,310,310 B1 * | 12/2007 | Shenoi et al. | ............... | 370/474 |
| 7,570,671 B2 * | 8/2009 | Perkins et al. | .............. | 370/535 |
| 2003/0072311 A1 | 4/2003 | Pfeiffer | | |
| 2003/0152112 A1 * | 8/2003 | Almog et al. | ............... | 370/535 |
| 2004/0042510 A1 * | 3/2004 | Bremer et al. | ............. | 370/539 |
| 2004/0141530 A1 * | 7/2004 | Spio | ........................... | 370/535 |
| 2004/0213241 A1 * | 10/2004 | Kukic | ...................... | 370/395.1 |
| 2005/0254500 A1 * | 11/2005 | Hauenstein et al. | ...... | 370/395.1 |

* cited by examiner

*Primary Examiner*—Chi H. Pham
*Assistant Examiner*—Kevin Mew
(74) *Attorney, Agent, or Firm*—Dicke, Billig & Czaja, PLLC

(57) ABSTRACT

A device includes multiple separate transmission channel facilities including first and second transmission channel facilities each having a standard network interface unit configured to transmit bundling data. The device includes a facility configured to bundle transmission channel facilities and to transmit a sub-stream of a data stream to be transmitted via transmission channels to be bundled as a stream of bundling data via the standard network interface units between the first transmission channel facility and the second transmission channel facility.

21 Claims, 6 Drawing Sheets

DATA TRANSMISSION WITH BUNDLING OF MULTIPLE TRANSMISSION CHANNEL FACILITIES

CROSS-REFERENCE TO RELATED APPLICATIONS

This Utility Patent Application claims priority to German Patent Application No. 10 2005 024 782.2, filed on May 31, 2005, which is incorporated herein by reference.

BACKGROUND

If a sending device and a receiving device are connected by multiple transmission channels (e.g., in the form of multiple data transmission lines) the data transmission rate between the sending device and the receiving device can be increased by bundling multiple transmission channels. The bundled transmission channels represent one logical transmission channel between the sending device and the receiving device, although the bundled transmission channels are in general separate physical connections which are spatially separated from each other.

The bundling of multiple transmission channels can be implemented in various ways, in particular on various layers according to the OSI layer model. For instance, in the case of the multilink point-to-point protocol (MPPP), the channel bundling is implemented on the network layer (i.e., the third layer according to the OSI layer model). Implementation of channel bundling on the first layer according to the OSI layer model, the physical layer, is advantageous, among other reasons, because such an implementation of channel bundling is independent of the specific protocols which are used on the higher layers according to the OSI layer model (i.e., it is transparent to these layers). Additionally, channel bundling on the physical layer is often technically simpler to implement than on higher layers according to the OSI layer model.

For these reasons, methods of bundling multiple transmission channels on the physical layer (also called bonding) have been developed, the bundled channels having a standard interface to the higher layers according to the OSI layer model. Examples of such implementations of channel bundling are the PMI aggregation function (PAF) bundling for Ethernet technology, in which Ethernet data packets are fragmented into smaller packets which are transmitted via the bundled transmission channels, and the IMA+ bundling for ATM technology, in which ATM cells are distributed to the bundled transmission channels and transmitted via them in such a way that the original sequence of cells can be restored in the receiving device.

However, neither PAF bundling nor IMA+ bundling define a specific form of a method and a facility for bundling multiple transmission channels on the physical layer. As illustrated in FIG. 6(*a*), a bundling facility 14 is often designed as a separate facility, which is connected to the transmission channels 11'-13' to be bundled and divides a data stream into the transmission channels 11'-13' to be bundled. However, the bundling facility 14 can also, as illustrated in FIG. 6(*b*), be designed as part of transmission channel facilities 11-13 to be bundled, of which at least one has an interface 15 to a facility which acts on a higher layer according to the OSI layer model (e.g., a media access controller (MAC)). However, if the transmission channel facilities to be bundled are separated in space, in the case of the implementation illustrated in FIG. 6(*b*) connections 17 are employed between the transmission channel facilities to be bundled to transmit sub-streams of the data stream to be transmitted via the transmission channels to be bundled from one transmission channel facility (e.g., 11) to another transmission channel facility (e.g., 12 or 13) and to thus implement the channel bundling.

FIG. 7 illustrates a specific example of data transmission using conventional bundling of two transmission channel facilities 11, 12 for the case that the bundling facility 14 is designed as part of the transmission channel facilities. Here the data to be transmitted via the transmission channels to be bundled is transmitted, for instance, via a first interface 15 between an Ethernet or ATM switch 18, which includes a media access controller (MAC) for each of the transmission channel facilities 11-13, and the bundling facility 14, which is designed as part of the first transmission channel facility 11. There the data is fragmented or defragmented, and a sub-stream of data is transmitted via the connection 17 from the first transmission channel facility 11 to the second transmission channel facility 12. Whereas the second transmission channel facility 12 can also have an interface 15 to the Ethernet or ATM switch 18, no data is transmitted via it, as illustrated by dashed lines. Instead, the transmission channel facilities 11 and 12 act as one logical transmission channel, which acts, to the Ethernet or ATM switch 18, as a facility on the first layer according to the OSI layer model.

However, depending on the specific form of the method and device for channel bundling, if the bundling facility is designed as illustrated in FIG. 6(*b*) or FIG. 7 as part of the transmission channel facilities, a physical connection between all pairs of transmission channel facilities to be bundled may be necessary. If, in the design of the data transmission device, maximum flexibility is to be preserved by the possibility of bundling arbitrary pairs of transmission channel facilities, the number of connections between transmission channel facilities to be bundled that are required to transmit sub-streams of data increases according to the square of the number of transmission channel facilities. In general, to bundle $N \geq 2$ transmission channel facilities, $N(N-1)/2$ connections between transmission channel facilities to be bundled are necessary, to transmit sub-streams of the data stream to be transmitted via the transmission channels to be bundled between the transmission channel facilities. Because of the quadratic increase of the number of required connections between transmission channel facilities to be bundled, for a large number of transmission channel facilities, such bundling of multiple transmission channel facilities is implemented at high cost.

For these and other reasons there is a need for the present invention.

SUMMARY

One embodiment provides a device configured to transmit data. The device includes multiple separate transmission channel facilities including first and second transmission channel facilities each having a standard network interface unit configured to transmit bundling data. The device includes a facility configured to bundle transmission channel facilities and to transmit a sub-stream of a data stream to be transmitted via transmission channels to be bundled as a stream of bundling data via the standard network interface units between the first transmission channel facility and the second transmission channel facility.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

Figure 1:
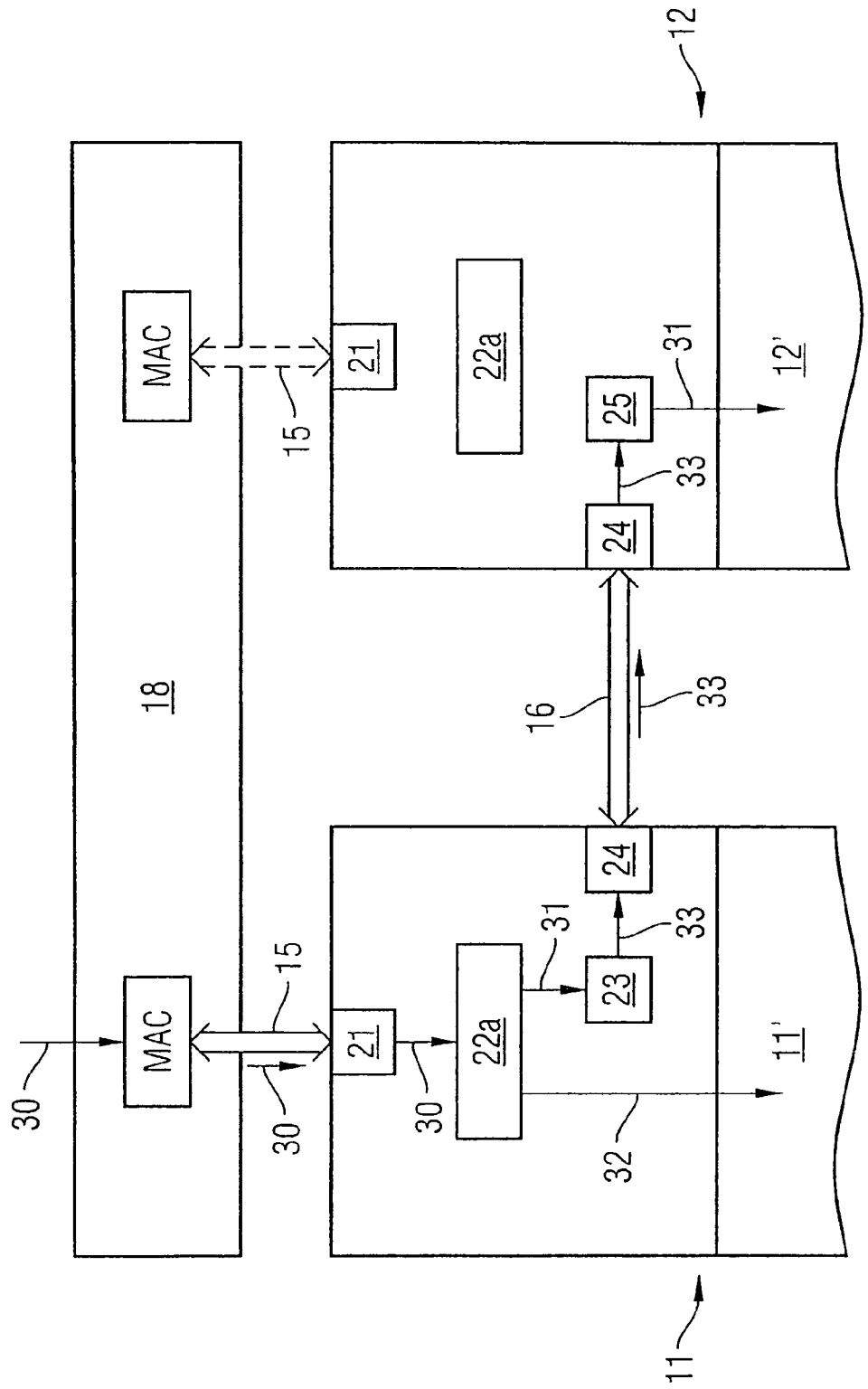
FIG. 1 illustrates schematically one embodiment of a device for data transmission, which acts as a sending device.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Embodiments provide a method, a device and a system for data transmission, using bundling of multiple separate transmission channel facilities. In some embodiments, the bundling function is implemented in such a way that data is transmitted between the transmission channel facilities to be bundled.

Embodiments provide a method, a device, and a system for data transmission, using bundling of multiple transmission channel facilities, a facility for channel bundling being formed as part of the transmission channel facilities, in which the number of connections which are necessary for bundling, to transmit sub-streams of the data stream to be transmitted via the transmission channels to be bundled, increases less strongly with the number of transmission channel facilities than it does according to conventional data transmission devices.

In the method for data transmission according to an embodiment, a stream of bundling data, which includes a sub-stream of the data stream to be transmitted via the transmission channels to be bundled, is output by a first or second transmission channel facility in a form which makes it possible to transmit it via a standard network interface between the first and second transmission channel facilities. Because of the form of the data output, it is possible to transmit bundling data between any pair of transmission channel facilities if the transmission channel facilities to be bundled each have an interface to one or more facilities which include a media access controller for the transmission channel facilities to be bundled. In particular, in an embodiment, the number of physical connections which are required to implement the bundling may be equal to the number of transmission channel facilities to be bundled, so that bundling of even a large number of transmission channel facilities is possible.

At least one of the transmission channel facilities to be bundled may have a first interface, via which the data stream to be transmitted via the transmission channels to be bundled is transmitted. In this transmission of the data stream to be transmitted via the transmission channels to be bundled, this transmission channel facility can act as a facility on the first layer according to the OSI layer model, to make channel bundling on the first layer according to the OSI layer model possible.

In an embodiment, the interface of the first or second transmission channel facility, via which the bundling data is transmitted, can be a standard interface of the Ethernet or ATM technology. In this way, the method for data transmission can easily be applied in existing networks for data transmission, and/or a device according to an embodiment can be easily integrated into them.

A sub-stream of the data stream to be transmitted via the transmission channels to be bundled may be encapsulated in the first transmission channel facility in such a way that it can be transmitted as a stream of bundling data via a standard network interface for data transmission to the second transmission channel facility, where the stream of bundling data may in turn be decapsulated. Correspondingly, an embodiment of the device for data transmission has a facility to encapsulate a data stream in the first transmission channel facility and a facility to decapsulate a data stream in the second transmission channel facility. The encapsulation of a sub-stream of the data stream to be transmitted via the transmission channels to be bundled makes it possible to transmit the sub-stream between different transmission channel facilities via standard network interfaces.

In one embodiment, the stream of bundling data can be transmitted via the interface of the first or second transmission channel facility, via which the data stream to be transmitted via the transmission channels to be bundled is transmitted.

In an embodiment, the first and second transmission channel facilities can be designed such that, when data is sent, the stream of bundling data is transmitted from the first transmission channel facility to the second transmission channel facility, and that, when data is received, the stream of bundling data is transmitted from the second transmission channel facility to the first transmission channel facility. In this way, it becomes possible to use the device according to embodiments both to send and to receive data, it being possible to transmit the data stream to be transmitted via the transmission channels via an interface of the first transmission channel facility, both when transmitting data and when receiving data.

The method according to various embodiments can be applied on both a sending side and a receiving side of a device for data transmission.

In general, the various embodiments can be used, for example, in networks for data transmission, in particular those which are based on the Ethernet or ATM technology, and in which the bundling of transmission channel facilities takes place on the physical layer. An advantage of an embodiment is that it may, in particular, be applied in networks in which as high a degree of flexibility as possible for bundling arbitrary combinations of transmission channel facilities and varying the bundling depending on the data stream to be handled is desired.

FIG. 1 illustrates schematically one embodiment of a device for data transmission, which acts as a sending device, and on the basis of which the method according to one embodiment will be explained below. The device for data transmission includes a first transmission channel facility 11 and a second transmission channel facility 12, each of which includes a transmission channel 11' and 12' respectively and has a first interface unit 21, via which data is transmitted from an Ethernet or ATM switch 18, which includes a media access controller (MAC) for the transmission channel facilities. Here the transmission channel facilities 11, 12 act to the Ethernet or ATM switch as facilities on the first layer according to the OSI layer model. For greater clarity, the following explanations are restricted to the Ethernet technology. However, it is to be understood that the various embodiments may also be used (e.g., in ATM technology).

In one embodiment, a facility for channel bundling is designed as part of the transmission channel facilities. In particular, the first transmission channel facility 11 includes a fragmenting facility 22a, an encapsulating facility 23, and a second interface unit 24 to transmit the bundling data. The second transmission channel facility 12 includes the second interface unit 24 to transmit the bundling data and a decapsulating facility 25. The second transmission channel facility can also include a fragmenting facility 22a, which, like its first interface unit 21, is not activated for data transmission to and from the Ethernet switch 18.

The operation of the device for data transmission is explained below. A data stream 30 to be transmitted via the transmission channels 11', 12' to be bundled is transmitted from the Ethernet switch 18 via a first interface 15 to the first transmission channel facility 11. The first interface 15 is any standard interface from the Ethernet technology (e.g., an MII interface). The data stream 30 is fragmented in the first transmission channel facility 11 by the fragmenting facility 22a into one sub-stream 31 and another sub-stream 32. The other sub-stream 32 is transmitted via the first transmission channel 11'. The sub-stream 31 is encapsulated by the encapsulating facility 23 in such a way that it can be transmitted via a standard network interface. In this case, the sub-stream 31 is encapsulated in Ethernet frames and provided with address information of the second transmission channel facility 12. The stream of bundling data 33 resulting from the encapsulation is transmitted via a second interface 16 to the second transmission channel facility 12. The second interface is a standard interface from the Ethernet technology (e.g., an MII interface), which is explained in more detail in the embodiments below. The stream of bundling data 33 is decapsulated in the second transmission channel facility 12 by the decapsulating facility 25, to obtain the sub-stream 31 of the data stream 30 to be transmitted via the transmission channels 11', 12'. The sub-stream 31 is then transmitted in the second transmission channel 12'.

Whereas the bundling data, as illustrated in FIG. 1, can be transmitted via a physical connection directly from the first 11 to the second transmission channel facility 12, advantages of various embodiments can be seen more clearly in the forms of transmission of the bundling data 33 between the first transmission channel facility 11 and the second transmission channel facility 12 which are described for the embodiments below.

Figure 2:
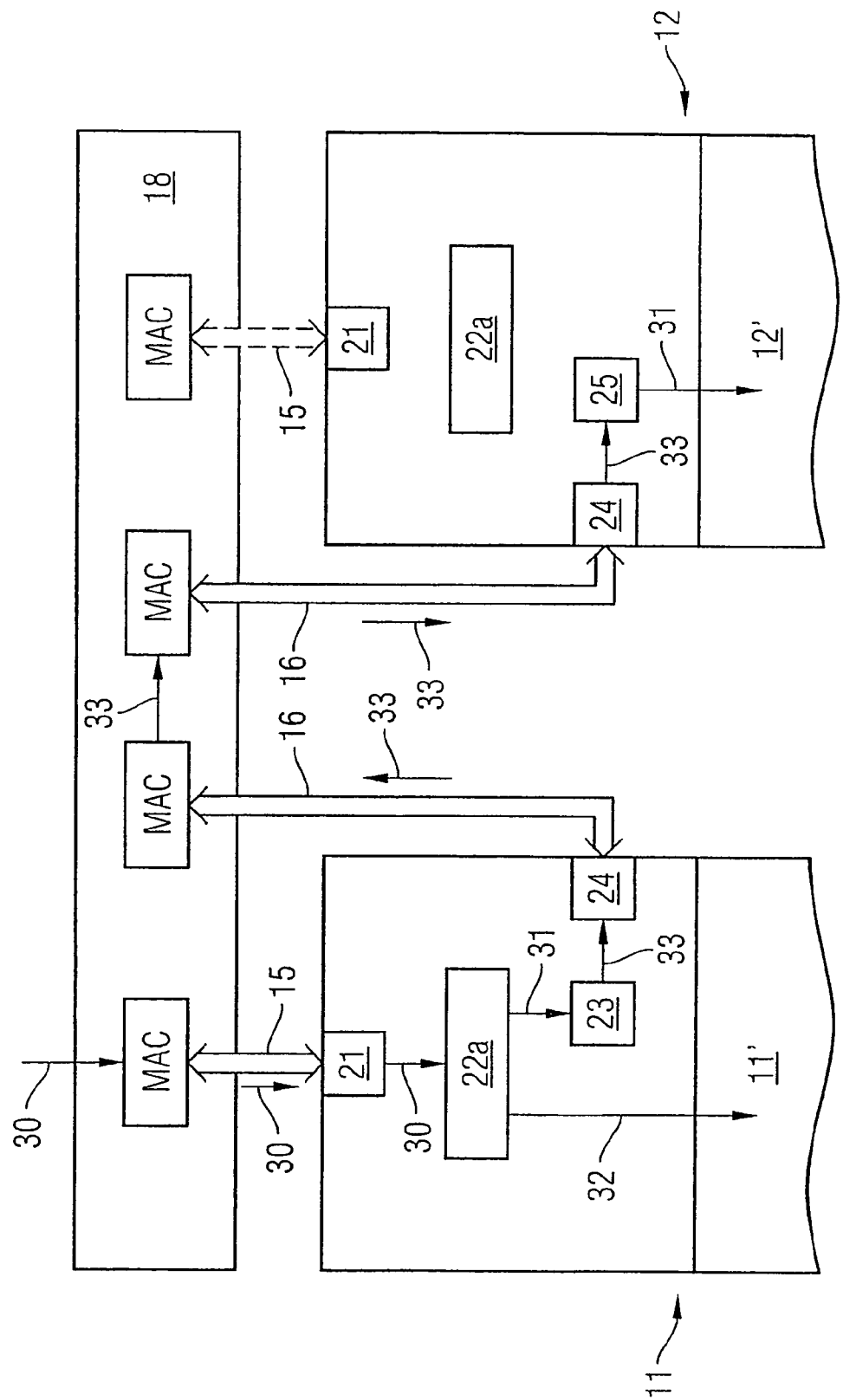
FIG. 2 illustrates schematically one embodiment of a device for data transmission, which acts as a sending device.

FIG. 2 illustrates schematically one embodiment of a device for data transmission, on the basis of which the transmission of the stream of bundling data 33 from the first transmission channel facility 11 to the second transmission channel facility 12 will be explained in more detail. The design of the transmission channel facilities 11, 12 and the transmission of the data stream 30 to the first transmission channel facility 12, its fragmentation and the encapsulation of the sub-stream 31 are similar to the embodiment illustrated in FIG. 1 and described above. Since the second interface unit 24 of the first transmission channel facility 11 and the second transmission channel facility 12 is a standard interface unit for an Ethernet protocol, and the bundling data 33, because of their encapsulation, is in a suitable form for transmission via standard network interfaces, the bundling data can be transmitted via standard network connections from the first transmission channel facility 11 to the second transmission channel facility 12. In the embodiment of FIG. 2 both the first 11 and the second transmission channel facility 12 have a second interface 16 to the Ethernet switch 18, so that the bundling data can be transmitted from the first transmission channel facility 11 to the second transmission channel facility 12 via the Ethernet switch 18. The interface 16 between the first 11 or second transmission channel facility 12 and the Ethernet switch 18 is a standard interface of the Ethernet technology (e.g., an MII interface).

Figure 3:
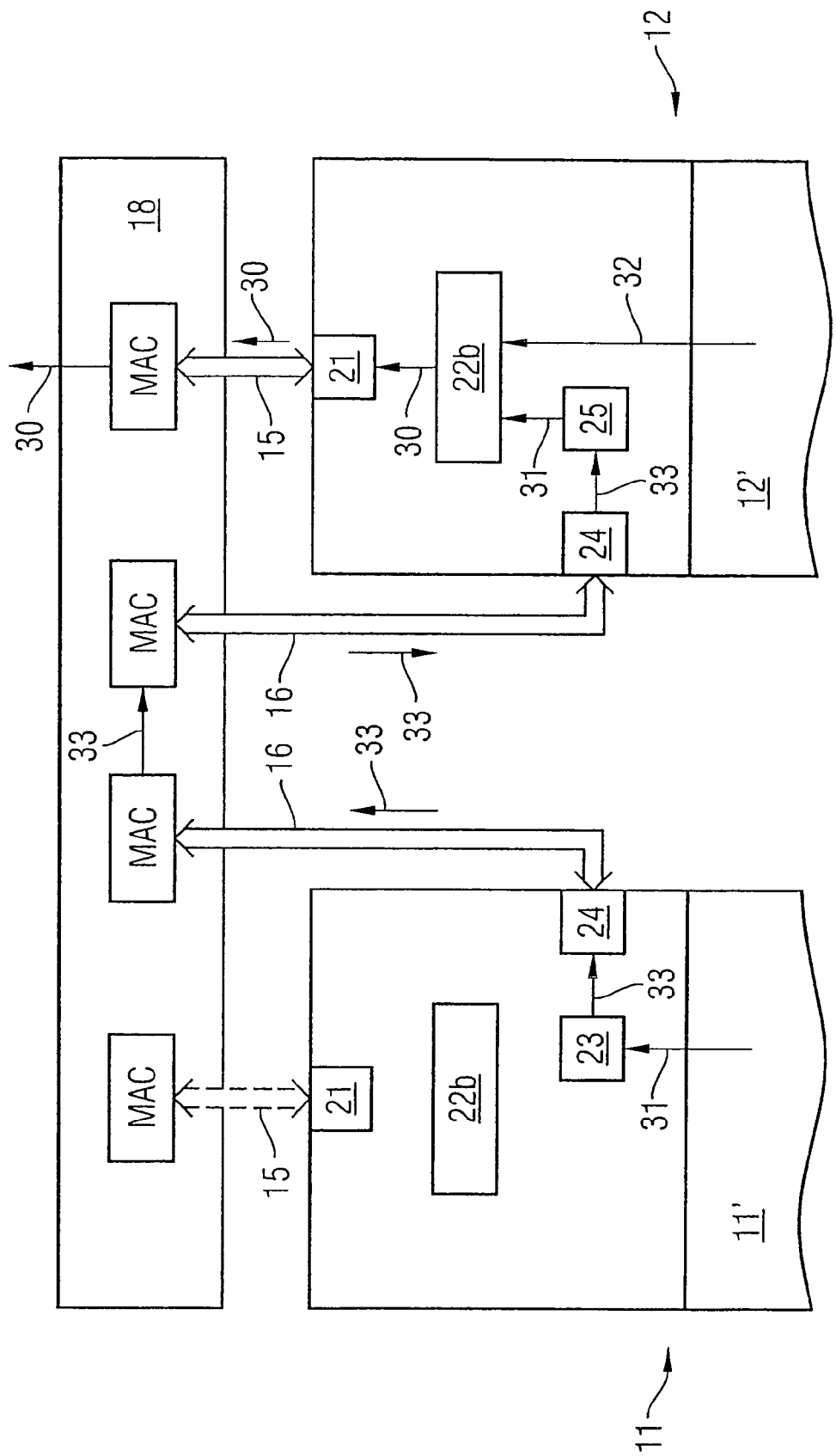
FIG. 3 illustrates schematically one embodiment of a device for data transmission according to the invention, when it acts as a receiving device.

FIG. 3 illustrates schematically the embodiment of a device for data transmission illustrated in FIG. 2, if it is operated as a receiving device. The first transmission channel facility 11 again has the encapsulating facility 23 and the second interface unit 24, and can include the first interface unit 21 and the fragmenting facility 22a or a defragmenting facility 22b, which are not activated. The second transmission channel facility 12 includes the second interface unit 24 for transmitting bundling data, the decapsulating facility 25, the defragmenting facility 22b and the first interface unit 21.

The method for data transmission is explained below on the basis of this embodiment of FIG. 3, for the case that the device is operated as a receiving device. The sub-stream 31 of the data stream 30 to be transmitted via the transmission channels 11', 12' to be bundled is transmitted in the first transmission channel 11', and the other sub-stream 32 of the data stream 30 to be transmitted via the transmission channels 11', 12' to be bundled is transmitted in the second transmission channel 12'. The sub-stream 31 is encapsulated in Ethernet frames in the first transmission channel facility 11 by the encapsulating facility 23, and provided with the address information of the second transmission channel facility 12. The stream of bundling data 33 resulting from the encapsulation is output via the second interface unit 24. Because of its encapsulated form, the bundling data 33 can be transmitted via standard network connections from the first transmission channel facility 11 to the second transmission channel facility 12. In the embodiment of FIG. 3, the second interface units 24 are in turn connected to the Ethernet switch 18, and the bundling data 33 is transmitted via the Ethernet switch 18 from the first transmission channel facility 11 to the second transmission channel facility 12. The interface 16 between the first 11 or second 12 transmission channel facility and the Ethernet switch 18 is a standard interface of the Ethernet technology (e.g., an MII interface). In the second transmission channel facility 12, the bundling data 33 is decapsulated by the decapsulating facility 25, to obtain the data sub-stream 31, which is defragmented with the other sub-stream 32 by the defragmenting facility 22b. The resulting data stream is the data stream 30 which is to be transmitted via the transmission channels 11', 12' to be bundled, and which is transmitted via the first interface 15 (e.g., an MII interface) to the Ethernet switch 18.

Figure 4:
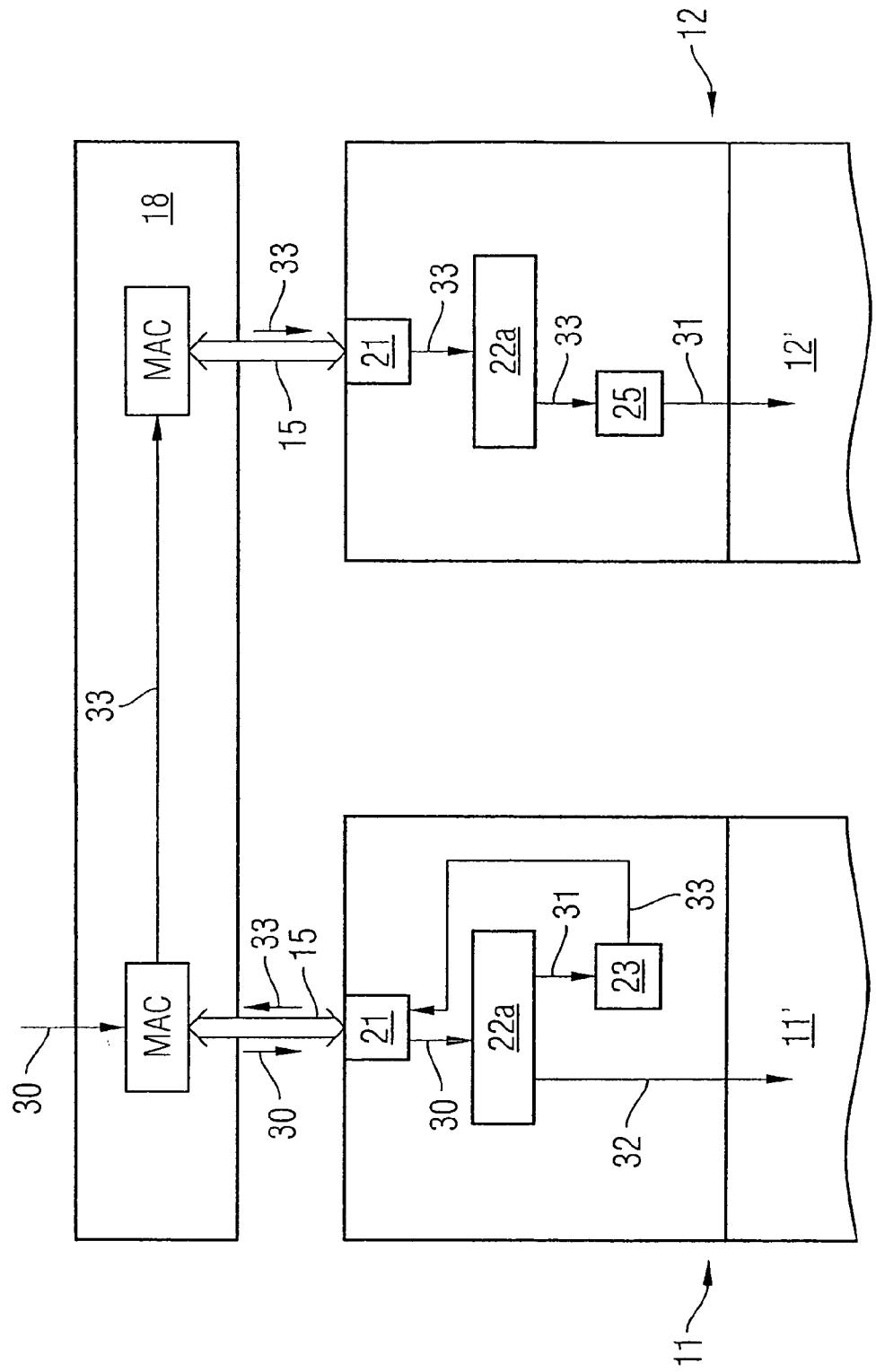
FIG. 4 illustrates schematically one embodiment of a device for data transmission, which acts as a sending device.

FIG. 4 illustrates schematically one embodiment of a device for data transmission, in which the bundling data 33 is transmitted via the first interface unit 21 of the first 11 and second 12 transmission channel facilities. The first 11 and second 12 transmission channel facilities each include a first interface unit 21 for data transmission to and from the Ethernet switch 18, and a fragmenting facility 22a, which is not activated in the second transmission channel facility 12. Additionally, the first transmission channel facility 11 includes an encapsulating facility 23, and the second transmission channel facility 12 includes a decapsulating facility 25.

The operation of the device of the embodiment of FIG. 4 and the method on which it is based are now described. The data stream 30 to be transmitted via the transmission channels 11', 12' is transmitted via the first interface 15 (e.g., an MII interface), to the first transmission channel facility 11, where it is fragmented by the fragmenting facility 22 into the sub-stream 31 and the other sub-stream 32. The other sub-stream 32 is transmitted via the first transmission channel 11'. The sub-stream 31 is encapsulated in Ethernet frames by the encapsulating facility 23, so that the stream of bundling data 33 resulting from the encapsulation can be transmitted via a standard network connection to the second transmission channel facility 12. In the embodiment of FIG. 4, the stream of bundling data 33 is transmitted via the first interface 15 of the first transmission channel facility 11 to the Ethernet switch 18, and from there via the first interface 15 of the second transmission channel facility 12 to the second transmission channel facility 12. Because the fragmenting facility 22a of the second transmission channel facility 12 is not activated, the stream of bundling data 33 is transmitted unchanged to the decapsulating facility 25, where it is decapsulated, to obtain the sub-stream 31. The sub-stream 31 is then transmitted in the second transmission channel 12'.

In a similar way to the embodiment of FIG. 2, the device according to the embodiment of FIG. 4, with the modifications which were explained on the basis of the embodiment of FIG. 3, can also be used for receiving a data stream.

For greater clarity, the above embodiments were restricted to devices and methods for data transmission in which the device acts either as a sending device or a receiving device. However, in general the transmission channel facilities 11, 12 can be designed so that they can act as both a sending device and a receiving device. In particular, both transmission channel facilities 11, 12 can have both an encapsulating facility 23 and a decapsulating facility 25, and both a fragmenting facility 22a and a defragmenting facility 22b, or a facility which can act as both a fragmenting facility 22a and a defragmenting facility 22b. If a device for data transmission according to an embodiment is to be operated as both a sending device and a receiving device, or the method for data transmission is to be operated for both sending and receiving data, for one of the two cases, sending or receiving data, in comparison with the above embodiments the roles of the first and second transmission channel facilities 11, 12 can be exchanged so that the data stream 30 to be transmitted via the transmission channels 11, 12 to be bundled is transmitted, for both sending and receiving, via the first interface 15 of a given transmission channel facility (e.g., 11). For instance, data can be sent by, as described above, the data stream 30 to be transmitted via the transmission channels 11, 12 being fragmented in the first transmission channel facility 11, and the sub-stream 31 being encapsulated and transmitted as a stream of bundling data 33 via standard network interfaces 15, 16 to the second transmission channel facility 12, whereas, for receiving data, the sub-stream 31 is encapsulated in the second transmission channel facility 12 and transmitted as a stream of bundling data 33 via standard network interfaces 15, 16 to the first transmission channel facility 11, where it is defragmented with the other sub-stream 32.

Figure 5:
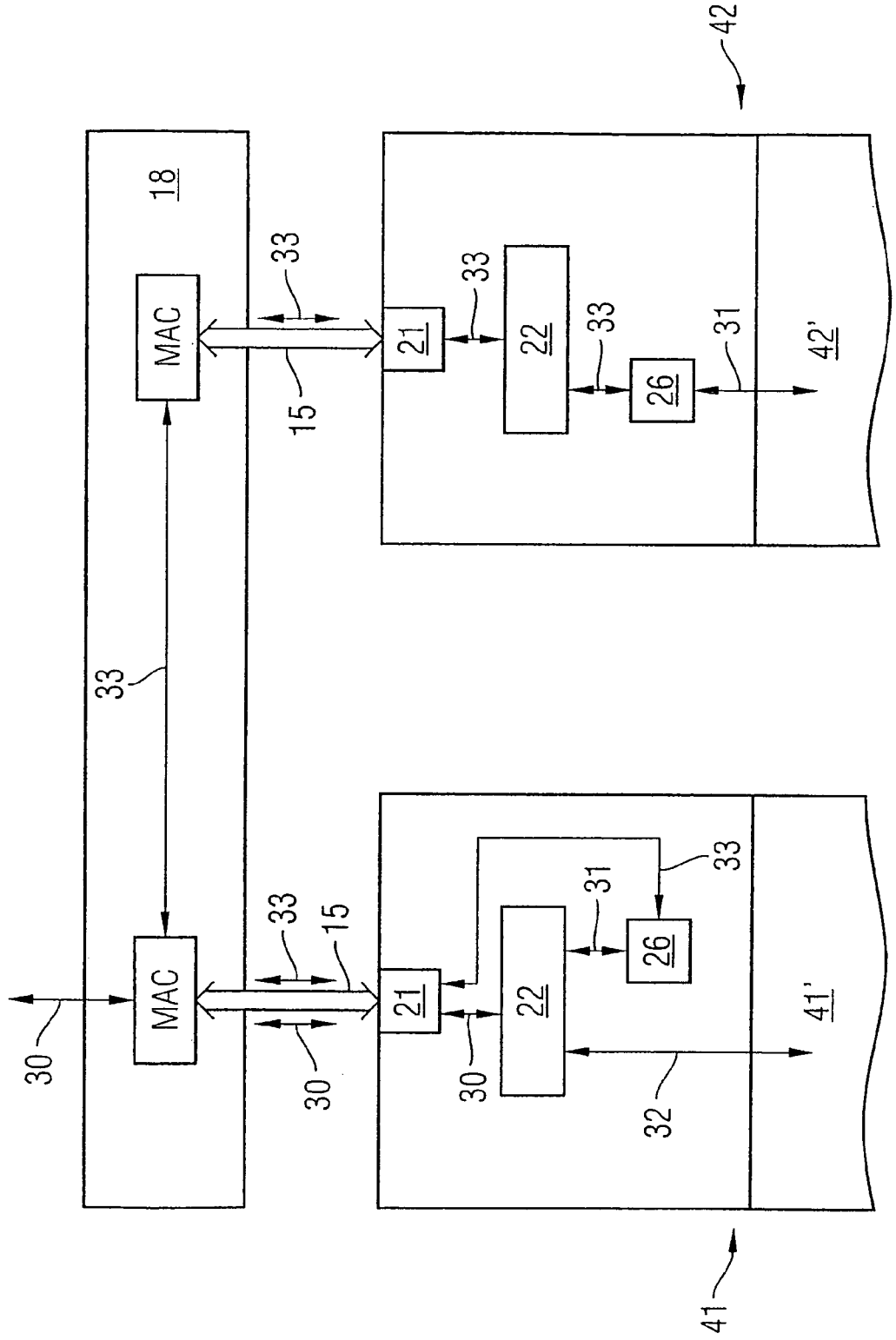
FIG. 5 illustrates schematically one embodiment of a device for data transmission, which can act as both a sending device and a receiving device.

Such a method will be explained on the basis of the embodiment of FIG. 5, where a device for data transmission can act as both a sending device and a receiving device. The first and second transmission channel facilities 41, 42 each have a facility 22 which can act as both a fragmenting facility and a defragmenting facility, and a facility 26 which can act as both an encapsulating facility and a decapsulating facility. In the embodiment of FIG. 5, the facility 22 of the second transmission channel facility 42 is deactivated, so that data is transmitted unchanged via the facility 22 of the transmission channel facility 42. For sending data, the data stream 30 to be transmitted via the transmission channels 41', 42' to be bundled is transmitted via the standard network interface 15 of the first transmission channel facility 41, and is fragmented in the first transmission channel facility 41 by the facility 22, the sub-stream 31 is encapsulated by the facility 26, and the resulting stream of bundling data 33 is transmitted via the standard network interfaces 15 of the first transmission channel facility 41 and the second transmission channel facility 42 to the second transmission channel facility 42, where it is decapsulated in the facility 26. In reverse, for receiving data, the sub-stream 31 is encapsulated by the facility 26 in the second transmission channel facility 42, and is then transmitted as a stream of bundling data 33 via the standard network interfaces 15 of the second and first transmission channel facilities 42, 41 to the first transmission channel facility 41. There, the stream of bundling data 33 is decapsulated by the facility 26, to obtain the sub-stream 31, which is then defragmented with another sub-stream 32 to obtain the data stream 30, which is transmitted via the standard network interface 15 of the first transmission channel facility 41. The advantage of such a design of the device according to one embodiment is that, for both sending and receiving data, the data stream 30 can be transmitted via the standard network interface 15 of a transmission channel facility, in this case the one of the first transmission channel facility 41. Obviously, such a design can also be implemented for the case illustrated in FIGS. 2 and 3, in which the bundling data is transmitted via the second interface 16 of a transmission channel facility.

Figure 6A:
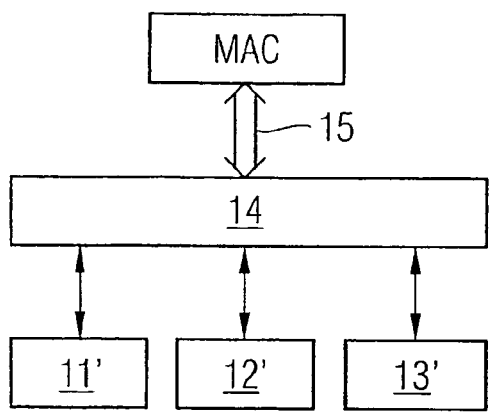
FIGS. 6(a) and 6(b) illustrate schematically different implementations of a conventional bundling facility.
Figure 6B:
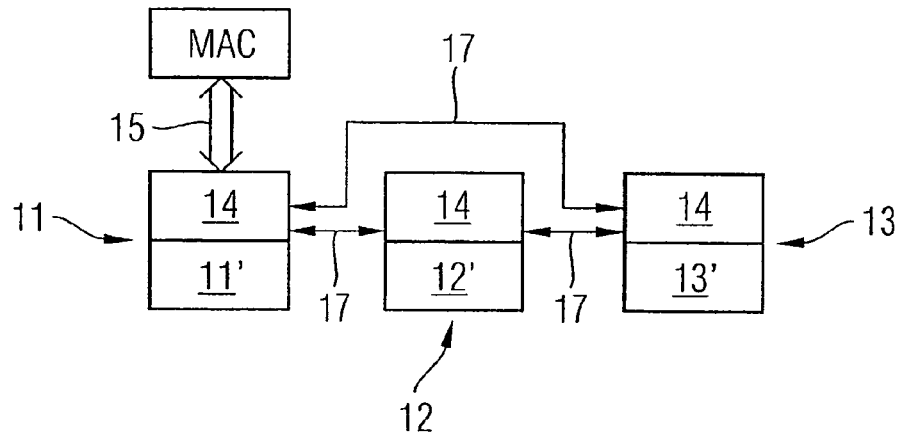
Figure 7:
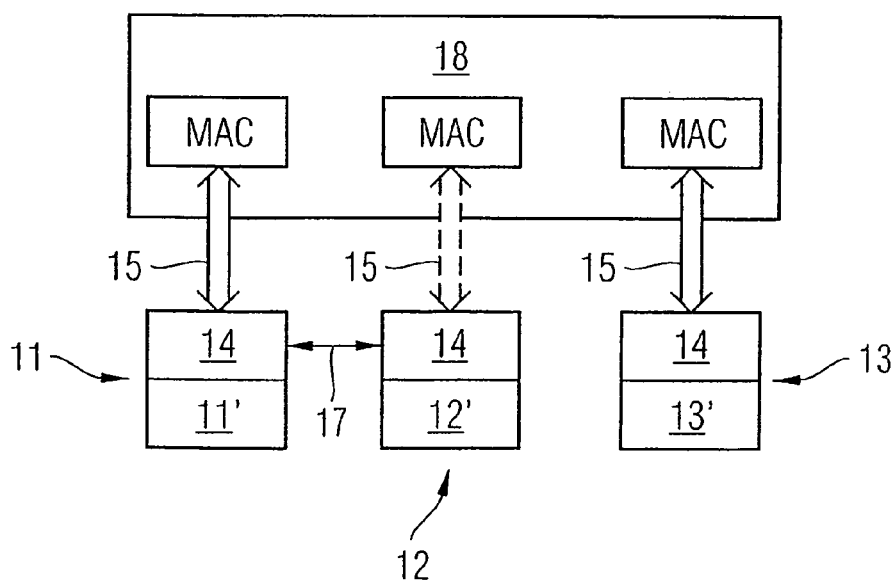
FIG. 7 illustrates schematically a conventional bundling facility.

Whereas, in the above embodiments, bundling of two transmission channel facilities 11, 12 has been explained by means of example only, the method according to the various embodiments of the invention can easily be applied to a number N>2 of transmission channel facilities, and a device for data transmission can thus include any number N≧2 of transmission channel facilities. Methods according to embodiments and corresponding devices according to embodiments are specially advantageous for bundling a large number N of transmission channel facilities, for which, in the conventional implementation illustrated in FIG. 6(b) of the facility for channel bundling, N(N−1)/2 physical connections between transmission channel facilities are necessary. In contrast, the device according to one embodiment can manage with only N physical connections, as illustrated in the above embodiments. For instance, for N=64, the number of required physical connections can be reduced from 2016 to 64 in this way. For any N, the method of data transmission can be designed so that the data stream in the first transmission channel facility 11 is defragmented into N sub-streams, of which N−1 are encapsulated and transmitted as a stream of bundling data to the other transmission channel facilities to be bundled.

Similarly, bundling of transmission channel facilities 11, 12 has been exemplarily explained for a network based on Ethernet technology above. However, embodiments are not restricted in this way, but can also be applied to other network technologies (e.g., ATM technology). Correspondingly, in some embodiments, the switch 18 is an ATM switch, the interfaces 15, 16 are standard interfaces of the ATM technology (e.g., PHOSPHY or UTOPIA interfaces), and the encapsulating facility 23 encapsulates the sub-stream 31 in ATM cells, so that the resulting stream of bundling data can be transmitted via the standard interfaces of the ATM technology.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of data transmission comprising:
   transmitting a sub-stream of a data stream to be transmitted via transmission channels to be bundled, as a stream of bundling data between a first transmission channel facility and a second transmission channel facility via a standard network interface for data transmission:
   transmitting the data stream to be transmitted via the transmission channels to be bundled via a first interface of the first or second transmission channel facility; and
   wherein the stream of bundling data is transmitted via the same first interface of the first or second transmission channel facility.

2. The method of claim 1, comprising:
   transmitting the data stream to be transmitted via the transmission channels to be bundled via a first interface of the first or second transmission channel facility; and
   facilitating the transmitting, with the transmission channel facility, on the first layer according to an OSI layer model, via the first interface of which the data stream to be transmitted via the transmission channels to be bundled is transmitted.

3. The method of claim 1, comprising:
   selecting an interface, as the standard network interface via which the bundling data is transmitted, from a group consisting of: an MII interface, a GMII interface, an RMII interface, an SMII interface, an SSSMII interface, a POSPHY interface, and a UTOPIA interface.

4. The method of claim 1, comprising:
   encapsulating the sub-stream in the first transmission channel facility to permit the sub-stream to be transmitted as a stream of bundling data via the standard network interface for data transmission to the second transmission channel facility.

5. The method of claim 4, wherein the encapsulating comprises:
   adding address information of the second transmission channel facility.

6. The method of claim 4, comprising:
   decapsulating the stream of bundling data encapsulated in the second transmission channel facility.

7. The method of claim 1, comprising:
   fragmenting the data stream to be transmitted via the transmission channels to be bundled into the sub-stream and another sub-stream in the first or second transmission channel facility.

8. The method of claim 1, comprising:
   defragmenting, in the first or second transmission channel facility, the sub-stream and another sub-stream of data, to obtain the data stream to be transmitted via the transmission channels to be bundled.

9. The method of claim 1, wherein, for sending the data stream, the method comprises:
   transmitting the stream of bundling data from the first transmission channel facility to the second transmission channel facility.

10. The method of claim 1, wherein, for receiving the data stream, the method comprises:
    transmitting the stream of bundling data from the second transmission channel facility to the first transmission channel facility.

11. A device configured to transmit data, the device comprising:
    multiple separate transmission channel facilities including first and second transmission channel facilities each having a standard network interface unit configured to transmit bundling data; and
    a facility configured to bundle transmission channel facilities and to transmit a sub-stream of a data stream to be transmitted via transmission channels to be bundled as a stream of bundling data via the standard network interface units between the first transmission channel facility and the second transmission channel facility, wherein at least one of the first and second transmission channel facilities includes:
    a first interface unit, via which the data stream to be transmitted via the transmission channels to be bundled is transmitted. wherein the first interface unit of the first or second transmission channel facility is one of the standard network interface units.

12. The device of claim 11,
    wherein at least one of the first and second transmission channel facilities includes a first interface unit, via which the data stream to be transmitted via the transmission channels to be bundled is transmitted; and
    wherein the transmission channel facility, via the first interface unit, is configured as a facility on the first layer according to an OSI layer model.

13. The device of claim 11, wherein the standard network interface unit is selected from a group consisting of: an interface unit of Ethernet technology and an interface unit of ATM technology.

14. The device of claim 11, wherein the first transmission channel facility includes:
    a facility configured to encapsulate the sub-stream of the data stream to be transmitted via the transmission channels to be bundled.

15. The device of claim 14, wherein the facility configured to encapsulate includes:
    a facility configured to add address information of the second transmission channel facility.

16. The device of claim 14, wherein the second transmission channel facility includes:
    a facility configured to decapsulate the stream of bundling data.

17. The device of claim 11, wherein at least one of the first and second transmission channel facilities includes:
    a facility configured to fragment the data stream to be transmitted via the transmission channels to be bundled.

18. The device of claim 11, wherein at least one of the first and second transmission channel facilities includes:

a facility configured to defragment the sub-stream and another data sub-stream of data, to obtain the data stream to be transmitted via the transmission channels to be bundled.

19. The device of claim 11, wherein, for sending the data stream, the stream of bundling data is transmitted from the first transmission channel facility to the second transmission channel facility, and, for receiving the data stream, the stream of bundling data is transmitted from the second transmission channel facility to the first transmission channel facility.

20. A system comprising:

a sending device configured to transmit data; and a receiving device configured to receive the data transmitted from the sending device;

wherein at least one of sending device and the receiving device includes:

multiple separate transmission channel facilities including first and second transmission channel facilities each having a standard network interface unit configured to transmit bundling data; and a facility configured to bundle transmission channel facilities and to transmit a sub-stream of a data stream to be transmitted via transmission channels to be bundled as a stream of bundling data via the standard network interface units between the first transmission channel facility and the second transmission channel facility, wherein at least one of the first and second transmission channel facilities includes:

a first interface unit, via which the data stream to be transmitted via the transmission channels to be bundled is transmitted, wherein the first interface unit of the first or second transmission channel facility is one of the standard network interface units.

21. A device for transmitting data, the device comprising:

multiple separate transmission channel facilities including first and second transmission channel facilities each having a standard network interface unit for transmitting bundling data; and means for bundling transmission channel facilities including means for transmitting a sub-stream of a data stream to be transmitted via transmission channels to be bundled as a stream of bundling data via the standard network interface units between the first transmission channel facility and the second transmission channel facility, wherein at least one of the first and second transmission channel facilities includes:

a first interface unit, via which the data stream to be transmitted via the transmission channels to be bundled is transmitted, wherein the first interface unit of the first or second transmission channel facility is one of the standard network interface units.

* * * * *